United States Patent
Tahon et al.

(10) Patent No.: US 7,351,442 B2
(45) Date of Patent: *Apr. 1, 2008

(54) METHOD OF PREPARING STORAGE PHOSPHORS FROM DEDICATED PRECURSORS

(75) Inventors: Jean-Pierre Tahon, Langdorp (BE); Johan Lamotte, Rotselaar (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 251 days.

This patent is subject to a terminal disclaimer.

(21) Appl. No.: 11/015,504

(22) Filed: Dec. 17, 2004

(65) Prior Publication Data

US 2005/0181119 A1    Aug. 18, 2005

Related U.S. Application Data

(60) Provisional application No. 60/535,971, filed on Jan. 12, 2004.

(30) Foreign Application Priority Data

Dec. 19, 2003   (EP)   ................................. 03104859

(51) Int. Cl.
    *B05D 5/06*   (2006.01)
(52) U.S. Cl. ......................................... 427/65; 427/69
(58) Field of Classification Search ................ 427/65; 250/362, 483.1, 362.01; 252/301.4 H
    See application file for complete search history.

(56) References Cited

U.S. PATENT DOCUMENTS

| | | | |
|---|---|---|---|
| 3,859,527 A | 1/1975 | Luckey | .................... 250/327 |
| 4,769,549 A | 9/1988 | Tsuchino et al. | ......... 250/484.1 |
| 5,055,681 A | 10/1991 | Tsuchino et al. | ......... 250/327.2 |
| 5,874,744 A | 2/1999 | Goodman et al. | .......... 250/584 |
| 2003/0047697 A1 | 3/2003 | Iwabuchi et al. | ........... 250/584 |
| 2003/0104121 A1 | 6/2003 | Leblans et al. | ................ 427/70 |
| 2003/0209675 A1 * | 11/2003 | Maezawa et al. | ......... 250/484.4 |
| 2004/0146639 A1 * | 7/2004 | Isoda | .......................... 427/157 |

FOREIGN PATENT DOCUMENTS

| | | |
|---|---|---|
| EP | 1 065 523 | 1/2001 |
| EP | 1 113 458 | 7/2001 |
| EP | 1 217 633 | 6/2002 |
| EP | 1 276 117 | 1/2003 |
| WO | 01/03156 | 1/2001 |

OTHER PUBLICATIONS

Patent Abstracts of Japan, Publication No. 2003-201119, published Jul. 15, 2003.
Patent Abstracts of Japan, Publication No. 06-230198, published Aug. 19, 1994.

* cited by examiner

*Primary Examiner*—Timothy Meeks
*Assistant Examiner*—Jimmy Lin
(74) *Attorney, Agent, or Firm*—Joseph T. Guy; Nexsen Pruet, LLC

(57) ABSTRACT

A method for producing CsX:Eu stimulable phosphors and screens or panels provided with said phosphors as powder phosphors or vapor deposited needle-shaped phosphors suitable for use in image forming methods for recording and reproducing images of objects made by high energy radiation, wherein said CsX:Eu stimulable phosphors are essentially free from oxygen in their crystal structure, and wherein X represents a halide selected from the group consisting of Br, Cl and combinations thereof, and wherein the method further comprises the steps of mixing CsX with a compound or combinations of precursor compounds having as a composition $Cs_xEu_yX'_{x+\alpha y}$, wherein the ratio of x to y exceeds a value of 0.25, wherein $\alpha \geq 2$ and wherein X' is a halide selected from the group consisting of Cl, Br and I and combinations thereof; heating said mixture at a temperature above 450° C.; cooling said mixture, and optionally annealing and recovering said CsX:Eu phosphor.

5 Claims, No Drawings

METHOD OF PREPARING STORAGE PHOSPHORS FROM DEDICATED PRECURSORS

The application claims the benefit of U.S. Provisional Application No. 60/535,971 filed Jan. 12, 2004.

FIELD OF THE INVENTION

The present invention relates to a solution for the synthesis or preparation of CsBr:Eu phosphors, free from impurities, more particularly free from oxygen, and to the preparation of screens or panels making use of said phosphors, as well as to methods of image formation with said screens or panels.

BACKGROUND OF THE INVENTION

A well known use of storage phosphors is in the production of X-ray images. In U.S. Pat. No. 3,859,527 a method for producing X-ray images with a photostimulable phosphor, incorporated in a phosphor panel, is disclosed. The panel is exposed to an incident pattern-wise modulated X-ray beam and as a result thereof the phosphor temporarily stores energy contained in the X-ray radiation pattern. At some interval after the exposure, a beam of visible or infra-red light scans the panel in order to stimulate the release of stored energy as light that is detected and converted to sequential electrical signals which are processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by any radiographic system using a phosphor screen, thus also by a digital radiographic system, largely depends on the construction of the phosphor screen. Generally, the thinner a phosphor screen at a given amount of absorption of X-rays, the better the image quality will be.

This means that the lower the ratio of binder to phosphor of a phosphor screen, the better the image quality, attainable with that screen, will be. Optimum sharpness can thus be obtained when screens without any binder are used. Such screens can be produced, e.g., by physical vapor deposition, which may be thermal vapor deposition, sputtering, electron beam deposition or other of phosphor material on a substrate. However, this production method can not be used to produce high quality screens with every arbitrary phosphor available. The mentioned production method leads to the best results when a phosphor is used the crystals of which melt congruently.

The use of alkali metal halide phosphors in storage screens or panels is well known in the art of storage phosphor radiology and congruent melting of these phosphors makes it possible to manufacture structured screens and binderless screens.

It has been disclosed that when binderless screens with an alkali halide phosphor are produced, it is beneficial to have the phosphor crystal deposited as some kind of piles, needles, tiles, or other related forms. So in U.S. Pat. No. 4,769,549 it is disclosed that the image quality of a binderless phosphor screen can be improved when the phosphor layer has a block structure, shaped in fine pillars.

In U.S. Pat. No. 5,055,681 a storage phosphor screen comprising an alkali halide phosphor in a pile-like structure is disclosed. The image quality of such screens still needs to be increased and in JP-A-06/230 198 it is disclosed that the surface of the screen with pillar like phosphors is rough and that a levelling of that surface can increase the sharpness. In U.S. Pat. No. 5,874,744 the attention is drawn to the index of refraction of the phosphor used in order to produce the storage phosphor screen with a needle-like or pillar-like phosphor.

In EP-A-1 113 458 a binderless storage phosphor screen is disclosed that comprises an alkali metal storage phosphor characterized in that said screen shows an XRD-spectrum with a (100) diffraction line having an intensity $I_{100}$ and a (110) diffraction line having an intensity $I_{110}$, so that $I_{100}/I_{110} \geq 1$. Such a phosphor screen shows a better compromise between speed and sharpness.

Upon excitation with high energy radiation, excitons or electron/hole pairs are created in prompt emitting phosphors and scintillators. In the subsequent recombination of an electron and a hole, energy is released which is used for the creation of a luminescent photon, i.e. for the luminescence process. The presence of defects in the phosphor material gives rise to additional energy levels in the band gap. As a consequence, electrons can de-excite in many small steps. The resulting energy packets are too small to give rise to photon emission. Instead thereof the energy is transformed in so-called phonons or lattice vibrations. I.e. the excitation energy is lost in the form of heat.

In a similar way as in prompt emitting phosphors, high energy radiation creates electron-hole pairs in storage phosphors. In these materials, many electron-hole pairs do not recombine directly. Instead thereof the electrons are trapped in electron traps and the holes are trapped in hole traps. Upon subsequent stimulation of the storage phosphor with light in the longer wavelength range as e.g. red light, the trapped electrons can absorb a photon. The photon supplies sufficient energy in order to escape from the trap. Such an escape is followed by recombination with a hole and by stimulated luminescence.

The traps in a storage phosphor are often intrinsic lattice defects. E.g. in alkaline earth halide and alkali halide storage phosphors, the electrons are trapped in halide vacancies, which are thus transformed into F-centres. If the storage phosphor crystal lattice is contaminated with foreign elements, additional defects are created. These defects can poison the luminescence as in a prompt emitting phosphor. In addition, these defects can compete with the intrinsic lattice defects as electron trapping centres. The additional defects are generally too unstable to be useful for long-term energy storage or too stable, so that the electrons are not released upon stimulation.

So, for prompt emitting phosphors and even more so for storage phosphors, it is of the utmost importance to avoid contamination with foreign elements.

Moreover high moisture content in the raw mix may cause troubles as bumping of the evaporation source which may occur as unacceptable inhomogeneities of the screens afterwards, while evaluating the quality thereof.

Many contaminations can be avoided by using very pure substances in the phosphor synthesis process. Other contaminations are more difficult to prevent.

Alkali halide and alkaline earth halide phosphors are often contaminated with oxides. The origin of this contaminating element may be water, adsorbed at the surface of the often slightly hygroscopic salt particles, more particularly at the surface of the Eu-compound derivatives. In the synthesis of the CsBr:Eu storage phosphor according to the state-of-the art methods the dopant material is often recognized as the source of oxygen contamination.

In EP-A 1 276 117, synthesis of CsBr:Eu starting from CsBr and a Europium compound selected from the group consisting of Eu(II)halides, Eu(III)halides and Eu-oxyhalides is described as an improvement over using $Eu_2O_3$ as a dopant material. It is clear that use of the above mentioned dopant compounds reduces the amount of the oxygen in the reaction mixture.

Yet, even use of europium halide $EuX_n$ ($2 \leq n \leq 3$) or europium oxyhalide (EuOX) may entail oxygen contamination. In the case wherein EuOX (X representing a halide) is used it is clear that oxide contamination will take place to a certain extent. As EuOX decomposes at a temperature of 700° C. or more (which represents a temperature, exceeding the melting temperature of CsBr:Eu with at least 100° C.) it is clear that the vaporization process lacks for a "one phase" process from its initial step and that, when all of the starting materials are mixed in only one crucible, a phase separation occurs, further provoking instability in the vapor deposition process, the more as this phenomenon also causes bumping during said evaporation process and inhomogeneous deposit onto the phosphor support. A solution could be sought by strict separation of the raw stock materials in several (at least two) crucibles followed by vaporization of raw materials or precursors from 2 crucibles or boats for the preparation of the dedicated phosphor, in such a manner that the resulting phosphor satisfies the stoichiometric requirements. Such a solution however requires strict geometrical arrangements within the vapor deposition chamber, and this may lay burden on the reproducibility of the process as the evaporation of the Cs-compounds and Eu-compounds proceeds after melting at differing temperatures.

Furtheron, even if a $EuX_n$ ($2 \leq n \leq 3$) material, without "structural" presence of oxygen at first sight is used, oxygen contamination will however take place, unless very strict precautions are taken.

$EuX_n$ ($2 \leq n \leq 3$) compounds are known to be very hygroscopic. $EuBr_3$ for instance is commercially available only as $EuBr_3 \cdot 6\text{-}9H_2O$, with an undefined number of water molecules bound as "crystal water". When this material is heated, hydrolysis will take place and EuOBr is formed.

In order to avoid hydrolysis, dehydration must be complete, because presence of 1 molecule of water per molecule of $EuBr_3$ is sufficient for complete transformation into EuOBr and HBr. Similar problems exist with other europium halides.

Hydrolysis and subsequent transformation into europium oxyhalide can be avoided if europium halide is heated to a temperature not higher than 200° C. under reduced pressure for a long time. For significant quantities, however, this process may take days or may even impossible to complete.

The resulting dehydrated europium halide will take up water, however, as soon as it is exposed to ambient atmosphere. This means that mixing with the CsBr matrix material must take place in a glove box or in a room with a conditioned, completely dry atmosphere. Also during transfer of the material to the reaction environment as e.g. a furnace to make powder CsBr:Eu or a vacuum chamber to make a CsBr:Eu phosphor layer by vapor deposition, precautions should be taken in order to avoid water take up.

Alternatively, the water containing raw mix, consisting of CsBr and dehydrated $EuX_n$ ($2 \leq n \leq 3$) can be dried in the reaction environment as in the furnace for production of CsBr:Eu powder or in the vacuum chamber for the production of CsBr:Eu layers by vapor deposition.

So in Applications US-A1-2003/0104121, in the corresponding EP-A-1217633 and in the PCT-filed WO-A-0103156, a CsX:Eu phosphor screen has been prepared comprising as preparation steps: mixing or combining CsX with between $10^{-3}$ mol % and 5 mol % of a europium compound, as, e.g., with $EuBr_3$ as starting raw material providing the europium dopant or activator, followed by vapor depositing that mixture onto a substrate and forming a binderless phosphor screen.

However drying a raw mix in a furnace is very time-consuming or even impossible, because the water must diffuse through a thick powder layer. Even for a limited thickness of the powder layer, the drying process may require several days, making the phosphor synthesis process very time consuming and inefficient.

When the raw mix is dried in the vacuum chamber in which vapor deposition should take place, a large amount of water vapor will be set free. This will disturb the vacuum and cause corrosion. Water will be readily adsorbed at the vacuum chamber walls and removal of the adsorbed water will again remain very time consuming.

In order to provide a method for manufacturing a europium halide molten and solidified body of high purity useful as a raw material for vapor deposition in particular, a method has been described in JP-A 2003-201119, wherein in the method for manufacturing the europium halide molten and solidified body, europium halide is molten by heating and then is cooled in the presence of a halogen source as e.g. ammonium halide, or a halogen as such, preferably under an atmosphere of dried air. In the presence of such compounds however corrosion may occur of environmental materials. Dryness processing during a heating time from 1 to 10 hours at temperatures up to 400° C. under vacuum moreover takes quite a lot of time.

Besides problems related with hygroscopy, corrosion, purity of the starting materials is not unambiguously provided as many undefined oxides may be present in different ratio amounts and as moreover presence in crucibles of differing undefined "phases" may give rise to sputtering or bumping while vaporising the starting materials so that an unstable vapor flow and a non-uniform deposition may occur.

OBJECTS AND SUMMARY OF THE INVENTION

Therefore it is an object of the present invention to offer a method, and more particularly a synthesis procedure, for the manufacturing CsBr:Eu as a powder phosphor or as a vapor deposited CsBr:Eu phosphor in a layer, wherein said CsBr:Eu phosphor has an excellent and reproducible quality.

More particularly it is an object to provide an efficient method to prepare a CsBr:Eu phosphor in powder form or in needle-shaped layer form, wherein said phosphor contains small amounts of oxygen as a contaminant in the phosphor crystal lattice.

Said "efficient method" should be understood as "requiring no special precautions in order to avoid water take-up by the raw mix of starting materials" and "requiring no time consuming drying step during phosphor synthesis", in that, within a temperature range between the melting point of the eutectic composition of CsBr and $EuBr_n$ and the melting point of the said component to which the crucible is heated, the vapor phase can be held more constant.

The above mentioned object has been realized by making use as a dopant material in the synthesis of CsBr:Eu of a compound having the general formula $Cs_xEu_yX'_{x+\alpha y}$, or, wherein X' is a halide selected from the group of Cl, Br and I, wherein $\alpha \geq 2$ and wherein x/y exceeds a value of 0.25.

Specific features for preferred embodiments of the invention are set out in the dependent claims.

Further advantages and embodiments of the present invention will become apparent from the following description.

DETAILED DESCRIPTION OF THE INVENTION

As described in the Journal of Less-Common Materials, Vol. 127 (1987), p. 155-160, the "ammonium bromide route to anhydrous rare earth bromides", in a first step $Eu_2O_3$, after having been treated with ammonium bromide following a "dry route", delivers as complex europium bromide salts $(NH_4)_2EuBr_5$ and $(NH_4)_3EuBr_6$, wherein, in a competing reaction EuOBr is formed. As an alternative therefor, in a wet preparation step, heating of a mixture of $NH_4Br$ and $Eu_2O_3$ in concentrated HBr. Hydrated $EuBr_3.6aq$ may be used but $NH_4Br$ in an excessive amount is required in order to avoid hydrolysis and formation of EuOBr.

$(NH_4)_2EuBr_5$ and $(NH_4)_3EuBr_6$ should be stored under dry conditions in order to avoid hydrolysis or hydrate formation, leading to oxybromide contamination during subsequent decomposition to tribromides. Decomposition of those ternary complex salts at temperatures in the range from 350-400° C. in vacuum however, in a final decomposition step, leads to the desired binary $EuBr_3$.

Otherwise, $EuBr_2$ can be prepared, starting from $Eu_2O_3$ as starting material, dissolved in diluted HBr and evaporated after addition of $NH_4Br$, wherein $EuBr_3$, dissociates in $EuBr_2$ and $Br_2$ as has been described in Mh. Chem., Bd 97, p. 863-865.

More useful information about phase equilibria, vaporization behavior and thermodynamic properties of europium tribromide can be found in J. Chem. Thermodynamics, Vol. 5 (1973), p. 283-290, wherein it has unambiguously been illustrated that a reversible equilibrium exists between tetragonally crystallized Eu-dibromide, orthorhombically crystallized dark-rustbrown Eu-tribromide, and bromine and wherein a disproportionation process from Eu-tribromide to Eu-dibromide and bromine is highly temperature dependent. So it has been shown that the said disproportionation process starts from a temperature of 200° C. on and that an equilibrium between the more hygroscopic Eu-tribromide and the less hygroscopic Eu-dibromide can only be attained after a further calcination as the reaction is distinctly endothermic. As a result condensed phases having a varying composition are measured up, to a $EuBr_{2.2}$ composition.

In US-A 2003/00424429 it is preferred that the europium compound, used in tablet form by compressing, is first treated by a reduction procedure of trivalent europium, followed by isolation and degassing before compressing. Besides CsBr as a main component (in an amount of at least 90 mol %) the tablets contain that europium compound in an amount of at most 10%. Before starting said compression it is required to heat the powder mixture in a nitrogen atmosphere and to fire it for 2 hours at 525° C., wherein the fired powder becomes dehydrated and degassed at 200° C. in an evacuated chamber in order to remove moisture as much as possible. After compression of the powders to tablets (requiring a high force of 800 kg/cm$^2$), an evaporation process of the tablet is performed by application of an electron beam.

In the present invention a more convenient, less moisture-sensitive method has been found, in that an evaporation process has been developed, starting from CsBr as a main component and $Cs_xEu_yX'_{x+\alpha y}$, wherein x/y>0.25, wherein $\alpha \geq 2$ and wherein X' is a halide selected from the group consisting of Cl, Br and I and combinations thereof. As described in Rare Metals, Vol. 21 (1), March 2002, p. 36-42, molten salt phase diagram evaluation by pattern recognition has lead to predict, without experimental proof, of the existence of intermediate compounds as, e.g. $CsEu_3Br_7$ (wherein CsBr is present in an amount of less than 50%), perovskite like $CsEuBr_3$ (wherein CsBr is present in an equivalent amount as $EuBr_2$), and $Cs_3EuBr_5$ (wherein CsBr is present in an amount of more than 50%), and wherein, in all of the intermediate compounds, divalent europium is present as an activator element or dopant.

Experimental evidence for the presence of those intermediates could be derived from XRD-analysis of the salts obtained, as XRD-signals appear, differing from the well-known signals as CsBr, EuOBr, $EuBr_3$, $EuBr_2$, $Eu_3O_4Br$ and $Eu_2O_3$.

According to the method of the present invention, producing a CsX:Eu stimulable phosphor, wherein X represents a halide selected from the group consisting of Br, Cl and combinations thereof, proceeds by following steps:

mixing CsX with a compound or combinations of precursor compounds having as a composition $Cs_xEu_yX'_{x+\alpha y}$, wherein x/y>0.25, wherein $\alpha \geq 2$ and wherein X' is a halide selected from the group consisting of Cl, Br and I and combinations thereof;

heating said mixture at a temperature above 450° C.

cooling said mixture, and optionally, recovering said CsX:Eu phosphor.

In a more preferred embodiment according to the method of the present invention, a ratio x/y=1; more preferably x/y>1; still more preferably a ratio x/y=3 and even most preferably x/y>3.

Moreover the said method of the present invention comprises a step of annealing at a temperature T in the range between 25° C. and 400° C. in an inert atmosphere, in air or in an oxygen atmosphere.

In the raw mix, wherein "raw mix" should be understood as a "mixture of salts containing Eu-precursor and CsBr salt, and wherein the said CsBr salt has been added in order to obtain that raw mix", between $10^{-3}$ and 25 mol % of Europium is present with respect to the total Cesium amount, and in a more preferred embodiment an amount of Europium in the range between $10^{-3}$ and 10 mol % with respect to the total Cesium amount is present.

Further according to the method of the present invention, the raw mix is present in only one crucible, wherein in the said raw mix between $10^{-3}$ and 5 mol % of Europium is present with respect to the total Cesium amount, more preferably in the said raw mix between $10^{-3}$ and 3 mol % of Europium is present with respect to the total Cesium amount.

In another embodiment of the method of the present invention, the raw mix is present in at least two crucibles, wherein in the raw mix, in at least one crucible, between between $10^{-3}$ and 80 mol % of Europium is present with respect to the total Cesium amount.

A binderless phosphor screen, according to the present invention, contains a CsX:Eu phosphor, prepared according to the embodiments of the methods as set forth hereinbefore.

According to the present invention a method for producing a binderless phosphor screen or panel comprises the steps of providing a CsX:Eu phosphor prepared by the embodiments of phosphor preparation as set forth, and depositing said phosphor on a substrate by a method selected from the group consisting of physical vapor deposition, chemical vapor deposition and an atomization technique.

Furtheron, according to the present invention, a method for producing a binderless phosphor screen or panel on a substrate containing a CsX:Eu stimulable phosphor, has been described, wherein X represents a halide selected from the group consisting of Br, Cl and combinations thereof, wherein said method comprises the steps of bringing in a deposition chamber, evacuated to 1 mbar or less and further adding an inert gas (like Ar) thereto (in order to change a vacuum from e.g. $10^{-4}$ mbar to 1 mbar), together with said substrate, multiple heatable containers of CsX and a precursor compound or a combination of precursor compounds having as a composition $Cs_xEu_yX'_{x+\alpha y}$, wherein X' is a halide selected from the group of Cl, Br and I and combinations thereof, wherein x/y>0.25, and wherein $\alpha \geq 2$, further depositing on said substrate, by a method selected from the group consisting of physical vapor deposition, chemical vapor deposition and an atomization technique, both said CsX:Eu and said precursor compound or a combination of precursor compounds having as a composition $Cs_xEu_yX'_{x+3y}$ or $Cs_xEu_yX'_{x+2y}$, in such a ratio that on said substrate a CsX:Eu phosphor is formed, wherein Eu is present as a dopant in an amount between $10^{-5}$ and 5 mol % (and in another embodiment between 10 and 5 mol %).

In a method according to the present invention for producing a phosphor screen or panel on a substrate containing a CsX:Eu stimulable phosphor, wherein X represents a halide selected from the group consisting of Br, Cl and combinations thereof, said method comprises the steps of bringing in a deposition chamber, evacuated to 1 mbar or less, together with said substrate, a heatable container wherein a mixture of CsX and a precursor compound or a combination of precursor compounds having as a composition $Cs_xEu_yX'_{x+\alpha y}$, wherein X' is a halide selected from the group of Cl, Br and I and combinations thereof, wherein x/y>0.25 and wherein $\alpha \geq 2$ (optionally $\alpha \leq 3$), further depositing on said substrate, by a method selected from the group consisting of physical vapor deposition, chemical vapor deposition and an atomization technique, both said CsX:Eu and said compound or a combination of precursor compounds having as a composition $Cs_xEu_yX'_{x+\alpha y}$.

In a particularly preferred embodiment according to the present invention only CsX is present in one crucible, while in another (a second) crucible $Cs_xEu_yX'_{x+\alpha y}$, optionally in the presence of CsX is provided. In an even more preferred embodiment in one crucible CsBr is present, while in the second crucible $Cs_xEu_yBr_{x+\alpha y}$, wherein x/y>0.25, and wherein wherein $\alpha \geq 2$ is present, optionally in the presence of another amount of CsBr.

In a further particularly preferred embodiment according to the present invention CsX is present in one crucible in the presence of $Cs_xEu_yX'_{x+\alpha y}$, while in another (a second) crucible $Cs_xEu_yX'_{x+\alpha y}$ is provided. In an even more preferred embodiment thereof in one crucible CsBr and $Cs_xEu_yBr_{x+\alpha y}$, wherein x/y>0.25, and wherein wherein $\alpha \geq 2$ is present, while in a second crucible $Cs_xEu_yBr_{x+\alpha y}$ is provided.

Moreover according to the present invention a method for recording and reproducing images of objects made by high energy radiation has been disclosed, wherein said method comprises as consecutive steps:

exposing an image storage panel with X-ray radiation, said panel comprising a CsX stimulable phosphor, wherein X represents a halide selected from the group consisting of Br, Cl and combinations thereof, wherein Eu is present as a dopant in an amount between $10^{-3}$ and 5 mol %, said phosphor having been prepared according to the above described method;

stimulating said panel with radiation having a wavelength between 500 nm and 1100 nm, thereby releasing stimulated radiation; and collecting said stimulated radiation.

Furtheron according to the present invention a method for recording and reproducing images of objects made by high energy radiation has been disclosed, wherein said method comprises as consecutive steps:

exposing a binderless phosphor screen as disclosed hereinbefore with X-ray radiation;

stimulating said panel with radiation having a wavelength between 500 nm and 1100 nm, thereby releasing stimulated radiation; and collecting said stimulated radiation.

Opposite to the requirement to first isolate and dry a trivalent europium derivative, to reduce the dried trivalent product in order to get europium in its divalent form, and to take a lot of precautions in order to homogenize the europium salt (present in an amount of less than 10 mol %) with the CsBr salt (present in an amount of more than 90 mol %), the activator or dopant is present as a stabilized divalent europium, embedded in CsBr as matrix component, together forming a stable complex ternary intermediate salt wherein the said formation of that complex and the formation of bromine ($Br_2$) shifts the equilibrium towards the presence of divalent europium as a dopant or activator ion.

The term "stable" not only reflects herein "presence as oxidation-resistant divalent europium against air oxygen and other oxidants", but also resistance to moisture and does not contain any halide like ammonium bromide or HBr gas.

As particularly stable complexes $Cs_xEu_yX'_{x+\alpha y}$ allow homogeneous melts when mixed together with CsBr and put together in a crucible for evaporation purposes: up to 600° C. a partial melt is observed yet. The first melting point observed is in the range of the eutectic composition. A higher temperature is thus required to integrally melt the mixture and once melting starts, it is clear that a melt is formed in a homogeneous way, without formation of differing phases, and without occurrence of sputtering or bumping. It is clear furtheron that this robust system as presented in the present invention shows advantages for an evaporation system making use of one, as well of as two "boats" or "crucibles", as no differing, non-compatible phases of activator precursor and main component are present anymore.

Experimental evidence has further been found for the purity of the stable complex ternary intermediate precursor salts by thermographic analysis. Moreover embedding CsBr together with $EuBr_2$ in a matrix, clearly reduces its hygroscopic properties.

Advantages related with the present invention as explained above are clearly related with stabilization of compounds, essential in the preparation method of the desired CsBr:Eu phosphor, in that solid particles, when treated at temperatures exceeding the temperature of 400° C., the eutectic composition is retained in a buffered state, even for a mixture of a main salt as CsBr and $Cs_xEu_yX'_{x+\alpha y}$ precursor.

A valid interpretation of the phenomena observed is clearly related with presence of solid core particles, acting as nuclei controlling evaporation within evaporation temperatures in the range from 585 to 675° C. and even up to 700° C. Interpretation of signals in XRD spectra most probably indicates perovskite like $CsEuBr_3$ besides $Cs_2EuBr_4$ as divalent europium precursors in the case wherein X' is Br.

The mentioned "buffered state" thus guarantees a constant composition of the vapor deposited CsBr:Eu.

EXAMPLES

While the present invention will hereinafter be described in connection with preferred embodiments thereof, it will be understood that it is not intended to limit the invention to those embodiments.

1. Preparation of Activator Element Precursors $Cs_x Eu_y Br_z$

Differing amounts of $EuBr_3$ and CsBr were weighed in order to prepare the precursor (EUBLA). After homogenising the mixture demineralized water was added until a clear solution was formed. The solution was added to a ROTAVAP® unit in a glass butt installed in a bath of triethylene glycol, heated up to 100° C. under vacuum (less than 50 mbar), until the solution was dried and was colored white to yellow.

Then drying was continued under vacuum during 8 hours at 150° C. The dried product was carefully weighed after cooling and stored in a gloovebox under an inert gas (nitrogen).

In the Table 1 hereinafter data have been summarized of the different experiments, giving the number of moles of $EuBr_3$ and CsBr, ratio of Eu vs. the total amount of Eu+CsBr, the netto weight obtained, the drying time and the number of moles of water, still present in the powdery mixture obtained by the procedure given hereinbefore.

From the Table 1 hereinafter it is concluded that less than 0.1 mole of water, present as "crystal water" is incorporated into the crystals of the crystal mixture thus obtained.

TABLE 1

|  | 0212A | 0212B | 0213A | 0213B | 0214A | 0214B | 1101 | 1102 |
|---|---|---|---|---|---|---|---|---|
| Moles $EuBr_3$ | .239953 | 0.239953 | 0.160047 | 0.2400705 | 0.1 | 0.1007051 | 0.3199765 | 0.4 |
| Moles CsBr | .5601504 | 0.56015 | 0.6400376 | 0.9600564 | 0.899906 | 0.899906 | 0.47979332 | 0.399906 |
| Ratio Eu/ Eu + CsBr | 0.30 | 0.30 | 0.20 | 0.20 | 0.10 | 0.10 | 0.40 | 0.50 |
| Netto weight | 214.74 | 214.5 | 200.35 | 300.2 | 231.78 | 232.2 | 229.32 | 244.44 |
| Drying time | 1 h 100° 8 h 150° | 1 h 100° 8 h 150° | 1 h 100° 8 h 150° | 1 h 100° 8 h 150° | 1 h 100° 8 h 150° | 1 h 100° 8 h 150° | 1 h 100° 8 h 150° | 1 h 100° 8 h 150° |
| Moles $H_2O$/mol | 0.0276831 | 0.011016 | 0.0480113 | 0.0494475 | 0.04375 | 0.0535032 | 0.02425582 | 0.051389 |
| Amt. Dry EuBr3 + CsBr | 214.34 | 214.34 | 199.66 | 299.49 | 231.15 | 231.43 | 228.97 | 243.70 |

2. Firing of Activator Element Precursors $Cs_x Eu_y Br_z$

In these experiments 50 g of the precursor powder were treated under nitrogen (1.5 l/min.), in an oven, and after 15 min. a firing procedure was started as summarized in the Table 2, wherein the firing conditions have been given, besides numbers of moles of CsBr per mol, of $EuBr_3$ per mol and of loss of weight, equivalent with loss of bromine for divalent Eu and trivalent Eu.

Table 2 illustrates the results obtained from intermediate compounds in the $CsBr/EuBr_2$ binary system in differing firing conditions.

TABLE 2

Firing conditions $CsBr/EuBr_2$ (30 mol % Eu)

|  | 0214/01/1 | 0214/02/1 | 0214/03/1 | 0214/04/1 | 0214/05/1 | 0214/07/1 |
|---|---|---|---|---|---|---|
| Firing cond. | 24 h 150° 3 h 200° | 24 h 150° 3 h 300° | 24 h 150° 3 h 400° | 24 h 150° 3 h 500° | 24 h 150° 3 h 600° | 24 h 150° 3 h 650° 1 h 575° |
| Moles CsBr/mol | 0.7 | 0.7 | 0.7 | 0.7 | 0.7 | 0.7 |
| Moles $EuBr_3$/mol | 0.3 | 0.3 | 0.3 | 0.3 | 0.3 | 0.3 |
| Moles CsBr+ | 0.188 | 0.188 | 0.190 | 0.188 | 0.188 | 0.188 |

TABLE 2-continued

Firing conditions CsBr/EuBr$_2$ (30 mol % Eu)

| | 0214/01/1 | 0214/02/1 | 0214/03/1 | 0214/04/1 | 0214/05/1 | 0214/07/1 |
|---|---|---|---|---|---|---|
| EuBr$_3$ | | | | | | |
| Eq. Loss of Br (EuBr$_2$) | 0.027 | 0.028 | 0.045 | 0.053 | 0.050 | 0.042 |
| Eq. Loss of Br (EuBr$_3$) | 0.029 | 0.029 | 0.012 | 0.004 | 0.006 | 0.015 |
| Color | yellow | dark yellow | very dark yellow | dark yellow | dark yellow | brown |

It is concluded from the weight balance in the Table 2 that the precursor compound obtained by firing is indeed corresponding with the binary CsBr/EuBr$_2$ system and that the thus provided precursor is Cs$_x$EuBr$_{2+x}$. Analoguous results could be obtained for every ratio of intermediate compounds as obtained hereinbefore for a 70/30 molar ratio (further performed experiments were done for ratios 90/10; 80:20; 60/40 and 50/50). From the Table 2 at higher temperatures of 600° C., there is a loss in evaporating CsBr. The weight reduction obtained is clearly equivalent with loss of bromine in the reduction step wherein EuBr$_3$ gets reduced to EuBr$_2$ and wherein Br is lost.

In a summarising Table 3, melting temperatures have been given for compounds obtained after firing of differing ratios of CsBr and EuBr$_3$ precursor mixtures and % weight reduction between 100° C. and 200° C. (measured by thermogravimetrical analysis—TGA—and by discontinue scanning calorimetry—DSC).

TABLE 3

| Mol % of CsBr | Mol % of EuBr$_3$ | Melting temperature T$_{melt}$ | Weight reduction % between 100-200° C. |
|---|---|---|---|
| 100 | 0 | 640° C. | 0 |
| 90 | 10 | 585° C. | 0 |
| 80 | 20 | 635° C. | 0 |
| 70 | 30 | 675° C. | 0 |
| 60 | 40 | | |
| 0 | 100 | 680° C. | >22.8* |
| | | | >9.23** |

*% weight reduction for an EuBr$_3$.6H$_2$O product
**% weight reduction for a dried EuBr$_3$.xH$_2$O It is concluded from the Table 3 that the precursor compositions as obtained after firing are not hygroscopic, if compared with the EuBr$_3$ and EuBr$_2$ compounds. At low temperatures, no increasing weight has been measured. The Cs$_x$EuBr$_{2+x}$ precursor together with CsBr provides an even better melting and evaporation behavior, if compared with the system CsBr/EuOBr. Optimized evaporation circumstances should be experimentally determined.

3. Characterization of Activator Element Precursors Cs$_x$Eu$_y$Br$_z$ by X-ray Diffraction (XRD)

From XRD-spectra of Cs$_x$EuBr$_{2+x}$ precursor as prepared above, wherein the mixture was fired at 400° C., it has become clear that the "2 θ"-peaks in the diffraction spectrum of the fired Cs$_x$EuBr$_{2+x}$ precursor unambiguously indicate that peaks as registered are similar with those known from of CsSmBr$_3$ and that only extra peaks are found that should correspond with CsBr and with EuOBr impurities. Furtheron it has unambiguously been shown moreover that peaks of EuBr$_2$, EuBr$_3$, Eu$_3$O$_4$Br and Eu$_2$O$_3$ do not appear, which is a further proof for the unambiguously demonstrated presence of the Cs$_x$EuBr$_{2+x}$ precursor.

It has thus been clearly demonstrated that, opposite to the prior art literature, precursor compounds differing from the well-known EuBr$_3$ are excellent precursors, suitable for use as starting raw materiuals in the synthesis of CsBr:Eu phosphors. Presence of the more particularly desired CsEuBr$_3$ and Cs$_2$EuBr$_4$ starting precursor raw materials as dopant or activator sources has unambiguously been demonstrated by means of X-ray diffraction as a suitable analysis technique.

As formulated in the objects of the present invention no special precautions are required in order to avoid water take-up by the raw mix of starting materials, clearly differing from the envisaged CsBr:Eu phosphor composition to be synthesized, and no time consuming drying step during the synthesis of that CsBr:Eu phosphor is required.

Having described in detail preferred embodiments of the current invention, it will now be apparent to those skilled in the art that numerous modifications can be made therein without departing from the scope of the invention as defined in the appending claims.

What is claimed is:

1. A method for producing a binderless phosphor screen or panel comprising the steps of providing a CsX:Eu phosphor prepared according to a method for producing a CsX:Eu stimulable phosphor, wherein X represents a halide selected from the group consisting of Br, Cl and combinations thereof, comprising the steps of
    mixing CsX with a precursor compound or combinations of precursor compounds having as a composition Cs$_x$Eu$_y$X'$_{x+\alpha y}$, wherein x/y>0.25, wherein $\alpha \geq 2$ and wherein X' is a halide selected from the group consisting of Cl, Br and I and combinations thereof;
    heating said mixture at a temperature above 450° C. cooling said mixture, and
    optionally, recovering said CsX:Eu phosphor and depositing said phosphor on a substrate by a method selected from the group consisting of physical vapor deposition, chemical vapor deposition and an atomization technique.

2. A method for producing a binderless phosphor screen or panel on a substrate containing a CsX:Eu stimulable phosphor, wherein X represents a halide selected from the group consisting of Br, Cl and combinations thereof, said method comprising the steps of:
    bringing in a deposition chamber, evacuated to 1 mbar or less and further adding an inert gas thereto, together with said substrate, multiple heatable containers containing CsX and a precursor compound or a combination of precursor compounds having as a composition $Cs_xEu_yX'_{x+\alpha y}$, wherein X' is a halide selected from the group of Cl, Br and I and combinations thereof, wherein x/y>0.25s, and wherein $\alpha \geq 2$, further depositing on said substrate, by a method selected from the group consisting of physical vapor deposition, chemical vapor deposition and an atomization technique, said CsX:Eu stimulable phosphor, wherein said precursor compound or a combination of precursor compounds having as a composition $Cs_xEu_yX'_{x+3y}$ or $Cs_xEu_yX'_{x+2y}$ is present in a ratio to CsX that on said substrate a CsX:Eu storage phosphor is formed, wherein Eu is present as a dopant in an amount between $10^{-5}$ and 5 mol %.

3. A method for producing a phosphor screen or panel on a substrate containing a CsX:Eu stimulable phosphor, wherein X represents a halide selected from the group consisting of Br, Cl and combinations thereof, said method comprising the steps of:

bringing in a deposition chamber, evacuated to 1 mbar or less, together with said substrate, multiple heatable containers containing CsX and a compound or a combination of precursor compounds having as a composition $Cs_xEu_yX'_{x+\alpha y}$, wherein X' is a halide selected from the group of Cl, Br and I and combinations thereof, wherein x/y>0.25, and wherein wherein $\alpha \geq 2$, further depositing on said substrate, by a method selected from the group consisting of physical vapor deposition, chemical vapor deposition and an atomization technique, said CsX:Eu stimulable phosphor, wherein said precursor compound or a combination of precursor compounds have as a composition $Cs_xEu_yX'_{x+\alpha y}$.

4. Method according to claim 3, wherein in one crucible CsBr is present, while in a second crucible $Cs_xEu_yBr_{x+\alpha y}$, wherein x/y>0.25, and wherein wherein $\alpha \geq 2$ is present, optionally in the presence of another amount of CsBr.

5. Method according to claim 3, wherein in one crucible CsBr and $Cs_xEu_yBr_{x+\alpha y}$, wherein x/y>0.25, and wherein wherein $\alpha \geq 2$ is present, while in a second crucible $Cs_xEu_yBr_{x+\alpha y}$ is provided.

* * * * *